United States Patent [19]
d'Alayer de Costemore d'Arc

[11] Patent Number: 5,946,291
[45] Date of Patent: Aug. 31, 1999

[54] SHUTTER AND BI-STABLE ACTUATING MEMBER PROTECTION DEVICE FOR HEAD OF PLAYBACK/RECORDING UNIT

[75] Inventor: Stephanie M. A. d'Alayer de Costemore d'Arc, Genappe, Belgium

[73] Assignee: Starr S.A., Brussels, Belgium

[21] Appl. No.: 08/831,513

[22] Filed: Apr. 1, 1997

[30] Foreign Application Priority Data

May 15, 1996 [BE] Belgium .................................. 9600442

[51] Int. Cl.$^6$ .................................................. G11B 7/125
[52] U.S. Cl. .......................................................... 369/292
[58] Field of Search ............................... 369/71, 72, 292, 369/43

[56] References Cited

U.S. PATENT DOCUMENTS

| | | | |
|---|---|---|---|
| 4,519,059 | 5/1985 | Denis | 369/74 |
| 5,170,304 | 12/1992 | Katohno et al. | 360/128 |
| 5,245,601 | 9/1993 | Hake | 369/72 |
| 5,268,890 | 12/1993 | Colescott | 369/71 |
| 5,297,122 | 3/1994 | Christie | 369/13 |
| 5,615,196 | 3/1997 | Kato | 369/71 |

FOREIGN PATENT DOCUMENTS

| | | |
|---|---|---|
| 19523785 | 1/1996 | Germany . |
| 53-37001 | 4/1978 | Japan . |
| 56-022228 | 2/1981 | Japan . |
| 61-237236 | 10/1986 | Japan . |
| 61-280043 | 10/1986 | Japan . |
| 63-146235 | 6/1988 | Japan . |
| 63-244467 | 10/1988 | Japan . |
| 63-244477 | 10/1988 | Japan . |
| 63-255839 | 10/1988 | Japan . |
| 4-330693 | 11/1992 | Japan . |
| 5144058 | 11/1993 | Japan . |
| 8-287508 | 11/1996 | Japan . |

OTHER PUBLICATIONS

Ahn et al, "A Planar Variable Reluctance Magnetic Micromotor with Fully Integrated Stator and Coils", Journal of Microelectromechanical Systems, vol. 2, No. 4, pp. 165–173, Dec. 1993.

Tai, "Micromotors", IEEE, pp. 8–11, May 1995.

Wagner et al, "Linear and Rotational Magnetic Micromotors Fabricated using Silicon Technology", Micro Electro Mechanical Systems, pp. 183–189, Jul. 1992.

Furuhata et al, "Outer Rotor Surface–Micromachined wobble Micromotor", IEEE, pp. 161–166, Feb. 1993.

*Primary Examiner*—David D. Davis
*Attorney, Agent, or Firm*—Leydig, Voit & Mayer, Ltd.

[57] ABSTRACT

A movable shutter is provided for protecting the head of an information playback and/or recording unit when de-activated, the shutter having head-covering and head-uncovering positions which are stable positions provided by a bi-stable actuating member for the shutter. The bi-stable actuating member is linked to move the shutter at any position of relative movement between the head and the information support. A circuit including the head and the bi-stable actuating member is connected to a power source and the actuating member is operated instantaneously responsive to the unit being switched on and off so that the shutter is moved to and kept at its stable head-covering position immediately and without delay at the location where it has been interrupted upon loss of power to the head. In one embodiment a mechanical bi-stable actuating member is provided for moving the shutter to protect the head of a cassette-tape recording/playback unit. In another embodiment for moving a shutter to protect the optical head of a disc playback/recording unit, the bi-stable actuating member is a micro step-motor having a permanent magnet rotor and an armature configured to move the rotor in opposite directions between stable positions upon receipt of positive or negative electrical pulses.

14 Claims, 2 Drawing Sheets

SHUTTER AND BI-STABLE ACTUATING MEMBER PROTECTION DEVICE FOR HEAD OF PLAYBACK/RECORDING UNIT

TECHNICAL FIELD

The present invention relates to playback/recording apparatus utilizing magnetic or optical playback/recording heads for processing analog or digital data on a support such as a disc, tape, or card. The invention relates more particularly to a device protecting heads of a playback/recording apparatus to prevent deposit of foreign matter on the heads during periods when the apparatus is not operating.

BACKGROUND ART

The improvements constantly being achieved in the field of information supports and playback/recording heads allow the information density to be doubled almost every three to four years. Thus, units are able to be more compact by utilizing heads of smaller sizes. As a result, foreign matter such as dust, impurities, smoke, water vapor, and conditions of high humidity, which was tolerated with larger size playback/recording heads, when deposited on smaller size heads, may hamper their performance or partially shut them off with the result of playback or recording of poor quality.

To overcome such drawback, a cleaning means has been proposed for playback/recording heads, such as described in U.S. Pat. No. 5,170,304, which is made temporarily operative upon switching the unit on. Nevertheless, such cleaning means are not satisfactory because, being integrated within the unit, they are only accessible with great difficulty and, accordingly, changing or servicing them is almost impossible although such should be regularly performed. In addition, they cannot prevent accumulation or deposit of foreign matter, particularly particles.

Applicant has also proposed, as disclosed in U.S. Pat. No. 4,519,059, elements covering the play-back head during a cleaning of the data support but this protection is temporary, being operative during a cleaning operation.

Japanese Patent Application 51-111500 discloses a device preventing a data support from being over exposed to the beam of a laser in the absence of recording by a shutter driven by an electromagnet. Such a device protects the support, not the head, and cannot be used in the vicinity of a magnetic or optical head because of the magnetic flux generated by the electromagnet; further, shielding of the head is unwise as being an expensive solution which further adds weight to a mobile element which should stay as light as possible.

German Application DE 195 23 785 discloses a rather large device shielding the playback head and further requires that the head be systematically powered back to a predetermined position (the lead-in track of the disc), which is burdensome and prohibits resuming playback instantaneously from the position where play mode has been interrupted. In addition, this specific movement is hardly possible in car units because switching off the car engine by the key turns off all power sources/lines to the playback/recording apparatus and, thus, no powered movement can be performed afterwards.

SUMMARY OF THE INVENTION

The primary aim of the present invention is to overcome all above-mentioned drawbacks by providing a simple, efficient protection device for playback/recording heads of an apparatus which can be operated at any time and does not require that a specific movement or phase be performed first.

Another object of the invention is to make provision for units equipped with such a head protection device to resume playback/recording of data instantaneously at the very position where it has been interrupted and upon power being restored or switched on again. This spares movement of the head and thus the power source.

A further object of the invention is to provide a low cost head protection device to avoid cost increase of the units in which it is to be incorporated.

A further object of the invention is to provide a head protection device which can be easily adapted to any type of apparatus: home, car, or portable units.

A further aim of the invention is to provide such a device which has very low power consumption to spare the power source (batteries, rechargeable batteries, etc.).

Still a further aim of the invention is to provide such a device which is extremely stable in operative and inoperative positions.

With a view of achieving those aims, the invention comprises a protection device for a playback/recording unit having a head which cooperates with an information support to read data recorded on the support, a circuit including the head connected to a power source and activating and de-activating the unit when the unit is switched on and off from the power source, and the protection device comprises a shutter movable between two stable positions which are, respectively, head-covering and head-uncovering positions, and a member which is actuated instantaneously, responsive to switching the unit on and off, and moves the shutter between its head-covering and head-uncovering positions.

BRIEF DESCRIPTION OF THE DRAWINGS

Further advantages and features will be apparent from a detailed description of two most preferred embodiments of the invention to which modifications can be made without departing from the scope of the invention and for which.

DETAILED DESCRIPTION OF PREFERRED EMBODIMENTS

Figure 1:
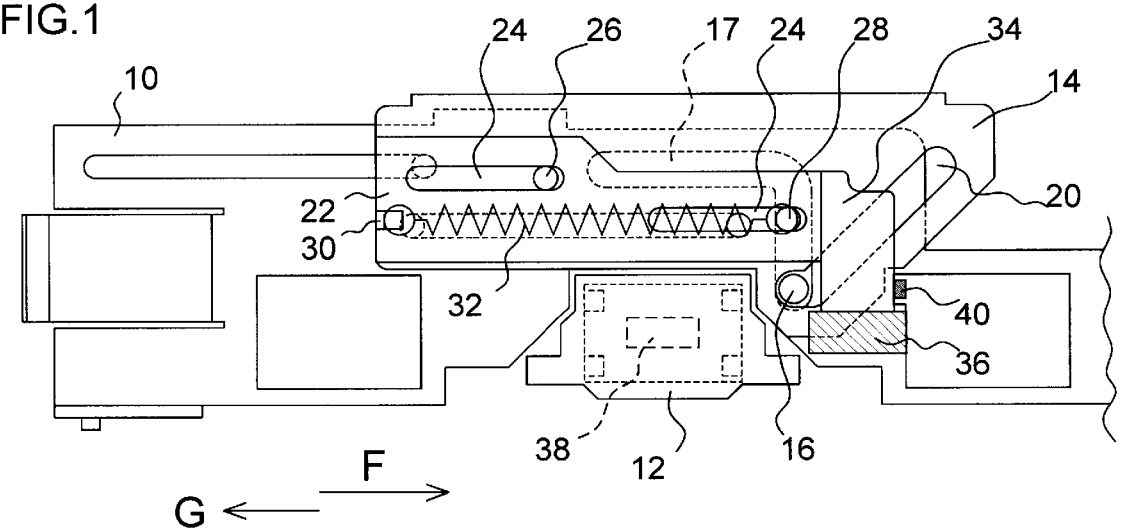
FIG. 1 is a front view of a first embodiment, the head protection device being in inoperative position.
Figure 3:
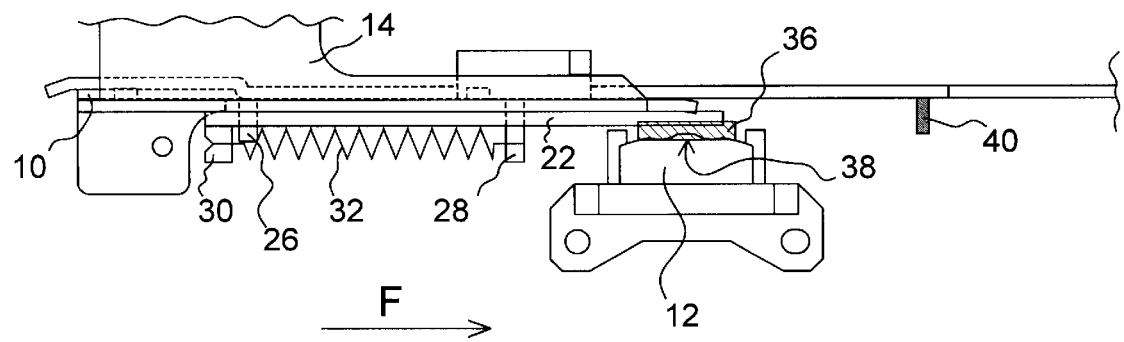
FIG. 3 is a top view of the device of FIG. 1 but in operative position.
Figure 2:
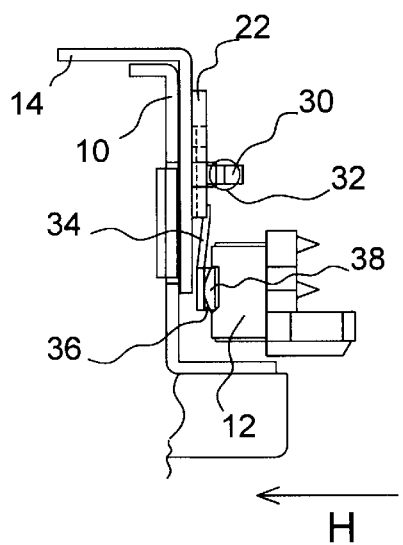
FIG. 2 is a lateral view of the device of FIG. 1.

Turning now to FIGS. 1–3, these figures illustrate a head protection device according to the invention for a magnetic playback/recording head of a cassette tape recorder apparatus such as disclosed in U.S. Pat. No. 4,546,396 and patent application 08/377,824 of the Applicant.

As shown, a fixed lateral wall 10 of the unit located close to the magnetic head 12 bears a slider 14 which is part of the mechanism setting the unit in playback/recording mode. The slider 14 performs a translation movement (arrows F, G) for guiding a stud 16 of the housing of the unit which receives a cassette containing a tape by a simultaneous movement through an L-shaped slot 17 provided in the wall 10 and an angled slot 20 in the slider 14.

According to the invention, a slider 22 incorporating two horizontal slots 24 providing passage to two studs 26, 28 and fixed to the slider 14 bears on and is guided by the external surface of said slider 14. A fold 30 provided on its left-hand edge serves as an anchoring point of a spring 32, its other extremity being attached to the stud 28, while on its right-hand edge the slider 22 bears, on a flexible support 34, a shutter or flange 36 having substantially the same size as the operative surface of the magnetic head 12 so as to cover and protect the head when positioned against it.

The support 34 is preferably made of a resilient material so that, in the operative position, the shutter 36 is flexibly held against the head 12.

In the absence of a cassette or when the unit is in inoperative position, all above-mentioned elements are in the position shown in FIG. 3 where the studs 26, 28 and the spring 32 prevents any movement of the slider 22 while the shutter 36 covers the operative face 38 of the head 12, thus preventing any deposit, accumulation, or contamination by dust, particle, vapor, smoke, or humid air.

Figure 7:
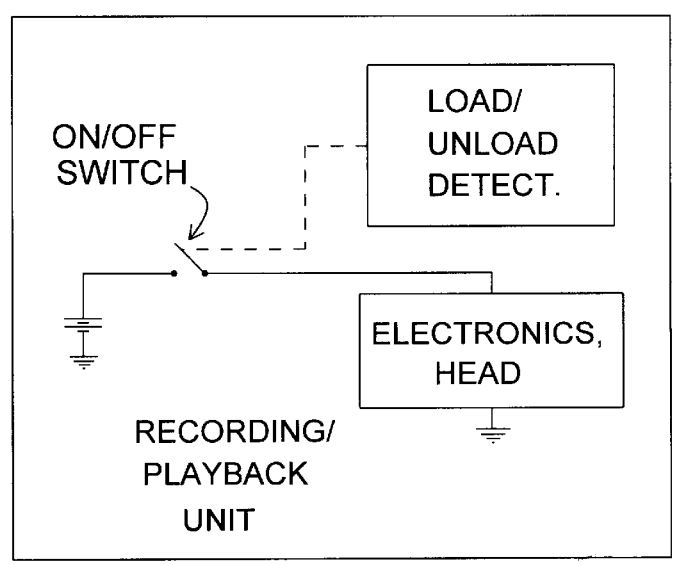
FIG. 7 is a diagrammatic view of a unit including its electronic and playback/recording head circuit.

When a cassette is loaded in the unit and the latter set in operative mode, for example, by detecting insertion of the cassette into the unit which operates the on/off switch of the unit shown in FIG. 7, the slider 14—in a well known and thus not described way—is translated (FIG. 3 arrow F).

As a result, the studs 26, 28 slide in the slots 24, letting the slider 22 undergo the action of the spring 32 which drives it in the same direction until it abuts against the right-hand extremities of the slots 24. Accordingly, the shutter 36 is removed from the surface 38 of the head 12 to reach the position shown in FIG. 1 where a stop 40 integral with the wall 10 limits its movement. The head 12 and thus its operative surface 38 are then exposed and can be moved towards the information support (FIG. 2 arrow H).

When the unit is switched by the on/off switch to its inoperative mode or the cassette is ejected, the head 12 is first driven back from the information support to allow the slider 14 to move (FIG. 1 —arrow G); accordingly, the studs 26, 28 reach the left-hand side extremity of the slots 24 and then move the slider 22 in the same direction, this movement bringing the shutter 36 against the operative surface 38 of the head 12 where it is held by the flexible support 34 (FIG. 3). Accordingly, responsive to switching the unit on and off, which may be caused automatically by detecting insertion of a cassette into the unit and the transfer of the cassette as the cassette is ejected, the slider 22 moves the shutter 36 to uncover or cover the recording/playback head 12. The surface 38 of the head 12 is thus permanently protected, shielded against any deposit or accumulation, by the shutter 36 when the unit is switched off.

Figure 4:
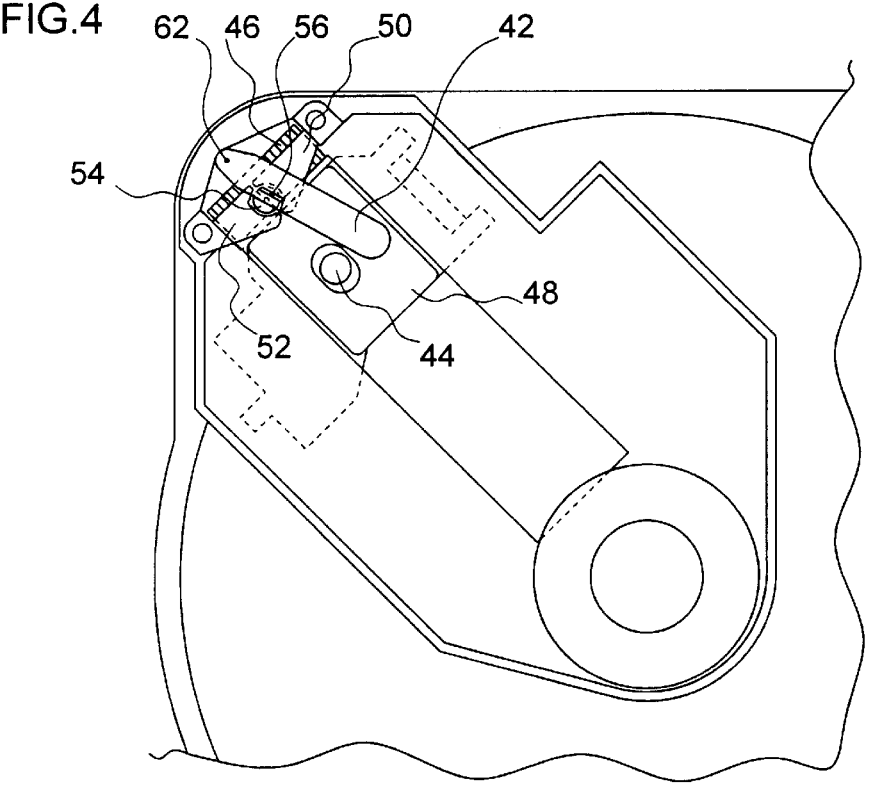
FIG. 4 is a partial top view of a second embodiment of head protection device according to the invention, the device being in an inoperative or playback position.
Figure 5:
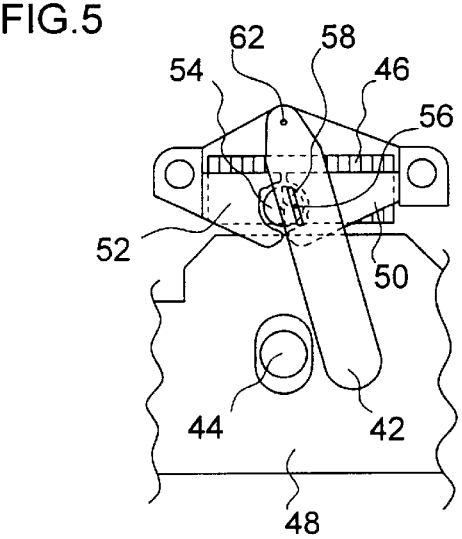
FIG. 5 is a detailed view, at a larger scale, of elements shown in FIG. 4.
Figure 6:
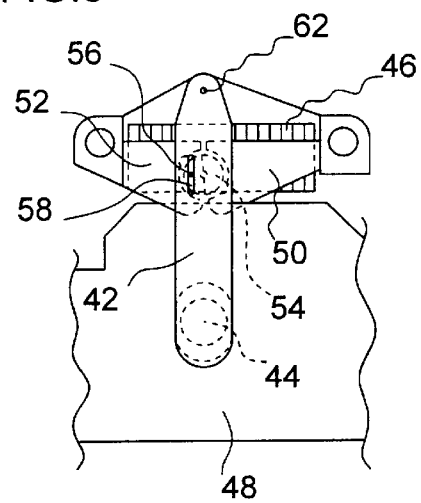
FIG. 6 is similar to FIG. 5, the device being in an operative or stop position.

Referring now to FIGS. 4–6, these figures illustrate a second embodiment of the invention more specifically appropriate for optical disc players of the portable type, i.e., units where the power source, of low voltage, must imperatively be spared. This embodiment also employs a shutter 42 which covers or uncovers the optical head lens 44 through which the beam of a laser diode is transmitted to read data from the surface of a disc.

As shown, an armature coil 46 is mounted on the mobile frame 48 which moves the lens 44 to insure tracking of the information and linked to two soft-iron armature plates 50, 52 enclosing a rotor 54 constructed of laminations of half-moon permanent magnet segments glued to a brass disc which provide North, South (NORTH, SOUTH (N, S)) poles on its respective halves. The brass disc provides strength to support an off-center stud 56 which cooperates as a crank through a slot 58 with the shutter 42 to pivot it around a shaft 62 on the frame 48.

The combination of the coil 46, the armature plates 50, 52, and the rotor 54 constitutes a micro step-motor, quite similar to those found in analog watches driven by a quartz and powered by a very short pulse involving a small amount of electrical energy. In a watch, it is important that the rotor always rotates in the same direction to add seconds, but in this construction, the direction is of no importance as rotation can be in opposite directions between bi-stable positions shown, respectively, in FIGS. 5A and 6A and produced by pulses of opposite polarity supplied to the armature coil 46. The two positions of the rotor 54 result from the polarity of the armature plates 50, 52 which is maintained by residual magnetism of the armature plates and the direction of which is determined by the current direction through the coil 46 of the current from the previous energizing pulse of the coil. As shown, each armature plate 50, 52 presents, in the vicinity of the rotor 54, a very small discontinuity 64 which causes the rotor 54 always to stop in a non-aligned position where its diameter separating its North and South poles is slightly offset from the axis of the slot separating the two armature plates 50, 52.

Figure 5A:
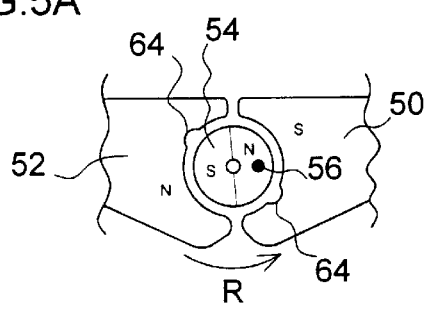
FIGS. 5A and 6A show, at a larger scale, details of a particular element of FIGS. 5 and 6.
Figure 6A:
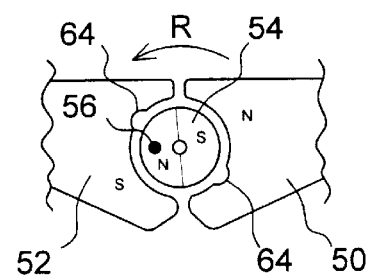

In order to move the shutter 42 between its stable positions, the coil 46 is powered by a very short electric pulse (100–200 ms) applied by a low voltage (1–3 V). The pulse may be a positive going pulse or a negative going pulse and is derived responsive, respectively, to switching the unit or its optical head "on" and "off". Reversing the direction of the current flow in the coil 46 reverses the polarities of the armature plates 50, 52 and thus causes the rotor to rotate one-half revolution and, via the crank stud 56 and slot 58, pivot the shutter 42 from one position to the other. For example, as shown in FIG. 6, the shutter 42 is in a position which covers the lens 44 and, as indicated in FIG. 6A, the crank stud 56 is in the left-hand quadrant adjacent the armature plate 52 shown to have a South polarity. In this position of the shutter 42 the unit is switched off. When the head is switched on, a positive going pulse is supplied to the armature coil 46 which reverses the polarity of the armature plates 50, 52 such that the rotor 54 rotates one-half turn to locate the crank stud 56 in the right-hand quadrant, as shown in FIG. 5A, adjacent the armature plate 50 which is of South polarity. When the unit and the lens 44 is switched off, a negative going pulse is supplied to the armature coil 46 which reverses the polarity of the armature plates to the state shown in FIG. 6A, which causes the rotor 54 to pivot the shutter 42 to cover the lens 44, as shown in FIG. 6.

In the most preferred embodiment of the invention shown in FIGS. 4–6, driving or energizing pulses for the head protection device of the invention are generated by the switching on and off of the unit and the optical head laser; accordingly, the lens 44 is uncovered or covered without significant delay immediately as the unit which incorporates the optical head is switched on or off. In both exemplary embodiments disclosed herein, the head protection device, according to this invention, is operated responsive to switching the unit on and off, whether the head is a magnetic read/write head for tape (FIGS. 1–3) or an optical head for playback of recordings on compact discs (CD) or laser discs (FIGS. 4–6). As shown in FIG. 7, the on/off switch is operated by a load/unload detector, although it may be actuated manually directly, if desired.

Further, because the energizing pulses, in the embodiment of FIGS. 4–6, are extremely short, the armature coil 46 does not need to be connected to a permanent source of power; accordingly, the device can be easily incorporated in units mounted in vehicle; also, the very small amount of power required allows this device to be incorporated in portable units such as personal CD players.

The two positions of the shutter 42 shown in FIGS. 5A and 6A are bi-stable as maintained by magnetic polarities of the armature plates and thus no shock or vibration can move the device out of synchronism.

Further the device is completely safe as it is unnecessary with residual magnetism to memorize the direction of the last electric pulse or the position of the shutter 42 in the event power is removed, or just fails. A positive pulse always pivots the shutter in one direction and a negative pulse always pivots the shutter in the opposite direction.

The magnetic fields which are created in the armature plates are of extremely low value and the polarities of the armature plates and the rotor permanent magnet segments being opposite and very close, there is no magnetic leak which could hamper operation of the laser head 44.

As a further alternative to a permanent magnet rotor 54 for pivoting the shutter 42, a magnetic material such as used in Signalex displays applied to the surface of the shutter 42 proximate and facing the armature plates 50, 52 will cause the shutter 42 itself to serve as a permanent magnet member and to pivot, responsive to reversal of polarity of the armature plates 50, 52 between its lens-covering and lens-uncovering positions, the reversal of armature plate polarity being produced by supplying pulses of appropriate sense to the armature coil 46.

I claim:

1. A protection device for a playback/recording unit providing relative movement between a head and an information support during playback or recording of data on the information support, a circuit including the head and switch means for connecting power to the head from a power source for activating the head, the protection device comprising:

a shutter movable between two positions which are, respectively, head-covering and head-uncovering positions, and a bi-stable actuating member supported and linked to move the shutter at all positions of relative movement between the head and the information support, which is powered upon power being connected to the head to move the shutter to the head-uncovering position, and which is powered upon loss of power to the head to move the shutter to the head-covering position, the shutter being movable by the bi-stable actuating member independently of relative movement of the head and the information support and being held by the bi-stable actuating member in the head-covering and head-uncovering positions both of which are caused to be stable positions by the bi-stable actuating member when in an un-powered state.

2. A protection device according to claim 1 wherein the playback/recording unit comprises a cassette unit having a head which cooperates with magnetic tape contained in a cassette, and includes a movable cassette transfer mechanism which carries a cassette between inoperative and operative positions, and wherein the bi-stable actuating member comprises a slider linked to the shutter and having guide slots, studs connected to the cassette transfer mechanism and received in the guide slots which guide movement of the slider, and a resilient coupling which moves the slider with the cassette transfer mechanism between bi-stable positions which provide the head-uncovering and head-covering positions of the shutter as a cassette is moved between its positions by operation of the cassette transfer mechanism.

3. A protection device according to claim 2 wherein the shutter comprises a pad on a flexible support which presses the pad against a surface of the head when the shutter is in the head-covering position.

4. A protective device according to claim 2 wherein a spring provides the resilient coupling for moving the slider with the cassette transfer mechanism.

5. A protection device according to claim 1 wherein the playback/recording unit comprises a disc player unit having an optical laser head, the head and a disc within the unit being supported for relative movement during playback or recording of information on the disc, wherein the bi-stable actuating member is a bi-stable electro-magnetic member supported adjacent the head at all positions of relative movement of the head and the disc during playback or recording, and wherein the shutter is linked to an element of the electro-magnetic member which is located in one of two stable positions when the electro-magnetic member is in an un-powered state and thereby causes said head-uncovering and head-covering positions of the shutter to be said stable positions.

6. A protection device according to claim 5 wherein the shutter is pivotally mounted, and wherein the electro-magnetic member is a micro step-motor including an armature element and a rotor element which is linked to and pivots the shutter via a crank as the rotor element is turned responsive to electric pulses supplied to the armature element of the micro step-motor.

7. A protection device according to claim 5 wherein the electro-magnetic member is a micro step-motor including a rotor element which holds the shutter in one of said head-covering and head-uncovering positions when said micro step-motor is in an un-powered state.

8. A protection device according to claim 7 wherein the micro step-motor includes an armature of magnetizable material and an armature coil which, when supplied with an electric pulse of appropriate polarity from the circuit of the unit, rotates the rotor element and moves the shutter, the polarity of the electrical pulse determining the state of the armature and which of said two stable positions the rotor element is stopped.

9. A protection device for a playback/recording unit providing relative movement between a playback/recording head and an information support during operations of playback or recording of information on the information support, means for activating and de-activating the head to perform and stop playback and recording operations, the protection device comprising:

a shutter movable between two positions which are, respectively, head-covering and head-uncovering positions, a bi-stable actuating member supported and linked to move the shutter at all positions of relative movement of the head and the information support, which is powered upon the head being activated to move the shutter to the head-uncovering position and keep the shutter stable in the head-uncovering position while the actuating member is in an un-powered state, and which is powered upon the head being de-activated to move the shutter to the head-covering position and keep the shutter stable in the head-covering position while the actuating member is in an un-powered state, the shutter being movable by the bi-stable actuating member independently of relative movement of the head and the information support.

10. A protection device according to claim 9 wherein the bi-stable actuating member comprises a micro step-motor including an armature element and a rotor element linked to the shutter.

11. A protection device according to claim 10 wherein the bi-stable actuating member comprises a micro step-motor having a permanent magnet rotor element and an armature element configured to rotate the rotor element one-half revolution between two stable positions responsive to electric pulses of opposite polarity supplied to the armature element resulting in current flow therein in opposite directions, which two stable positions of the rotor set the head-covering and head-uncovering positions of the shutter.

12. A protection device according to claim 9 wherein the head is deactivated by loss of power to the head caused by disconnecting a power source.

13. A protection device according to claim 12 wherein the head is connected in a circuit including switch means for connecting and disconnecting the head to a power source.

14. A protection device according to claim 9 wherein the playback/recording unit comprises a cassette unit having a head which cooperates with magnetic tape contained in a cassette, and includes a movable cassette transfer mechanism which carries a cassette between inoperative and operative positions, and wherein the bi-stable actuating member comprises a slider linked to the shutter and having guide slots, studs connected to the cassette transfer mechanism and received in the guide slots which guide movement of the slider, and a resilient coupling which moves the slider with the cassette transfer mechanism between bi-stable positions which provide the head-uncovering and head-covering positions of the shutter and keep it stable in these positions as a cassette is moved between its positions by operation of the cassette transfer mechanism.

* * * * *

UNITED STATES PATENT AND TRADEMARK OFFICE
CERTIFICATE OF CORRECTION

PATENT NO. : 5,946,291
DATED : August 31, 1999
INVENTOR(S): STEPHANE M. d'ALAYER de COSTEMORE d'ARC It is certified that error appears in the above-identified patent and that said Letters Patent is hereby corrected as shown below:

On the title page:

Under Item [75], Inventors, change "Stephanie M. A. d'Alayer de Costemore d'Arc" to --Stephane M. A. d'Alayer de Costemore d'Arc--.

Signed and Sealed this

Twenty-fifth Day of April, 2000

Attest:

Q. TODD DICKINSON

*Attesting Officer*        *Director of Patents and Trademarks*

UNITED STATES PATENT AND TRADEMARK OFFICE
CERTIFICATE OF CORRECTION

PATENT NO. : 5,946,291
DATED : August 31, 1999
INVENTOR(S) : STEPHANE M. d'ALAYER DE COSTEMORE d'ARC It is certified that error appears in the above-identified patent and that said Letters Patent is hereby corrected as shown below:

Title page,

Under Item [73], Assignee, please change "Starr" to --Staar--.

Signed and Sealed this

Twenty-seventh Day of June, 2000

Attest:

Q. TODD DICKINSON

*Attesting Officer*  *Director of Patents and Trademarks*